United States Patent [19]

Ryan

[11] 4,359,692
[45] Nov. 16, 1982

[54] RAPID ACQUISITION SHIFT KEYED SIGNAL DEMODULATOR

[75] Inventor: Carl R. Ryan, Gilbert, Ariz.

[73] Assignee: Motorola Inc., Schaumburg, Ill.

[21] Appl. No.: 204,743

[22] Filed: Nov. 7, 1980

[51] Int. Cl.³ .................. H03D 3/06; H04L 27/22
[52] U.S. Cl. ............................... 329/50; 329/124; 375/83
[58] Field of Search ............ 329/50, 110, 122, 124; 375/83–91

[56] References Cited

U.S. PATENT DOCUMENTS

| | | | |
|---|---|---|---|
| 3,189,826 | 6/1965 | Mitchell et al. | 375/86 |
| 3,568,067 | 3/1971 | Williford | 329/110 X |
| 3,588,720 | 6/1971 | Fluhr | 329/50 X |
| 4,085,378 | 4/1978 | Ryan et al. | 329/124 |

*Primary Examiner*—Siegfried H. Grimm

*Attorney, Agent, or Firm*—Eugene A. Parsons

[57] ABSTRACT

A shift keyed phase detector having a first input for receiving a signal including data shift keyed modulated on a carrier, such as BPSK, QPSK, MSK, SMSK, etc., and a second input for receiving a reference frequency from a local oscillator, to supply in-phase and quadrature channel data signals at differing phase error angles relative to the local oscillator reference frequency. The in-phase and quadrature channel signals are squared, and the squared signals are summed and filtered to provide a first phase error signal. The in-phase and quadrature channel signals are also multiplied with each other and filtered to provide a second phase error signal. The in-phase and quadrature channel signals are cross-multiplied with each of the phase error signals and then combined to provide a data signal in phase with the original data signal.

10 Claims, 1 Drawing Figure

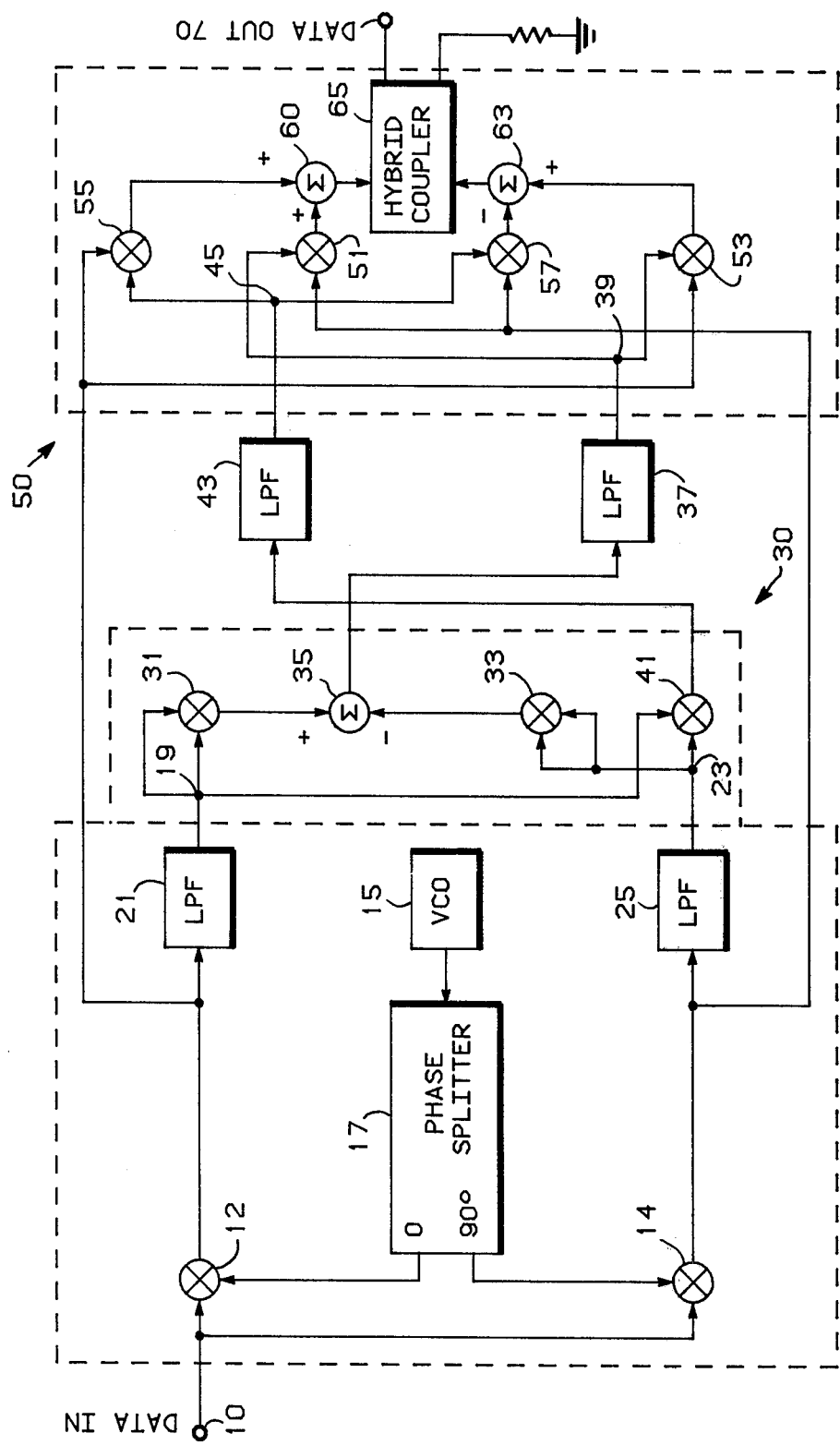

RAPID ACQUISITION SHIFT KEYED SIGNAL DEMODULATOR

BACKGROUND OF THE INVENTION

In prior art carrier demodulation of shift keyed signals, such as biphase shift keyed (BPSK), quadra-phase shift keyed (QPSK), offset quadra-phase shift keyed (O-QPSK), minimum shift keyed (MSK), serial minimum phase shift keyed (SMSK), etc., the carrier demodulator includes a voltage controlled oscillator which is continuously adjusted into phase with the incoming carrier by a phase locked loop. Typical examples of this type of demodulator are illustrated and described in U.S. Pat. No. 3,768,030, entitled "Automatic Signal Acquisition Means For Phase Lock Loop With Anti-Sideband Lock Protection", issued Oct. 23, 1973; U.S. Pat. No. 3,806,822, entitled "Phase Locked Loop Employing Alternating Current Injection for Fast Synchronization", issued Apr. 23, 1974; U.S. Pat. No. 4,085,378, entitled "QPSK Demodulator", issued Apr. 18, 1978, and U.S. Pat. No. 4,188,589, entitled "Automatic Signal Acquisition Means For a Phase Locked Loop With Anti-Sideband Lock Protection", issued Feb. 12, 1980. Conventional phase locked loops cannot be made to acquire rapidly with 100 percent certainty because of the quasi stable lock point at 180°. Various attempts have been made to improve the probability of lock by shaping the phase detector transfer function, injection locking, loop bandwidth variation, etc. These methods provide one to two orders of magnitude improvement, but normally require a significant additional circuit complexity.

SUMMARY OF THE INVENTION

The present invention pertains to a rapid acquisition carrier demodulator including a shift keyed phase detector providing in-phase and quadrature channel signals, combining circuits connected to receive the signals from the phase detector and generate a plurality of phase error signals, low pass filters connected to receive the phase error signals and substantially reduce noise therein, and further combining circuitry connected to receive the filtered phase error signals and combine them with the signals from the phase detector to provide a data signal with the phase error substantially removed. In this rapid acquisition demodulator the basic improvement is to make an estimate of the initial phase error between the received carrier and the frequency of the local oscillator and then correct the phase detector output based on this estimate. Since this correction is made outside the normal tracking loop and can respond to a full 360° phase error, no quasi stable point is present, resulting in an acquisition time directly proportional to the response time of the feed forward phase correction circuitry attached to the phase detector.

It is an object of the present invention to provide a new and improved rapid acquisition carrier demodulator.

It is a further object of the present invention to provide feed forward phase correction circuitry in conjunction with a shift keyed phase detector to adjust the phase of the data, rather than the phase of the local oscillator, and substantially reduce the acquisition time.

These and other objects of the present invention will become apparent to those skilled in the art upon consideration of the accompanying specification, claims and drawing.

DESCRIPTION OF THE DRAWING

The single FIGURE is a simplified block diagram of a rapid acquisition carrier demodulator embodying the present invention.

DESCRIPTION OF THE PREFERRED EMBODIMENT

Referring specifically to the FIGURE, the numeral 10 indicates an input terminal adapted to receive data shift keyed modulated on a carrier, for example an MSK signal at an intermediate frequency (IF). The terminal 10 is connected to a first input of a multiplier 12 and a first input of a multiplier 14. The output of a local oscillator, designated 15, is supplied through a phase splitter 17 to second inputs of each of the multipliers 12 and 14. The phase splitter connects the zero shift or in-phase signal from the oscillator 15 to the multiplier 12 and a 90° phase shifted signal from the oscillator 15 to the multiplier 14.

As is well known in the art, the oscillator 15 operates at approximately the frequency of the carrier in the signal applied to the terminal 10 and the multipliers 12 and 14 operate to essentially subtract the oscillator 15 signal from the incoming signal. Since the signal provided by the oscillator 15 is not exactly in phase with the carrier of the incoming signal at terminal 10, the data signals produced by the multipliers 12 and 14 will contain some phase error signals. That is, the in-phase channel signal, or the signal from the multiplier 12, is essentially equal to $$D_I \cos \phi + D_Q \sin \phi$$

where:
 $D_I$ represents the in-phase data,
 $D_Q$ represents the quadrature data, and
 $\phi$ is the phase error between the incoming carrier and the signal generated by oscillator 15, or The quadrature channel signal, or the output of multiplier 14, is essentially equal to $$-D_I \sin \phi + D_Q \cos \phi.$$

The in-phase channel signal is supplied to an output terminal 19 through a low pass filter 21, which removes noise and the like therefrom. The quadrature channel signal is supplied to an output terminal 23 through a low pass filter 25. The signals of interest at the output terminals 19 and 23 are essentially similar to the signals prior to the low pass filters 21 and 25, which are described by the above equations.

The output signals from the phase detector at the terminals 19 and 23 are supplied to a first combining circuit, generally designated 30. In the present embodiment, which is, for example, an MSK demodulator, the in-phase channel signal from the terminal 19 is supplied to both inputs of a multiplier 31 and the quadrature channel signal from the terminal 23 is supplied to both inputs of a multiplier 33. Thus, each of the signals are multiplied times themselves, or squared, in the multipliers 31 and 33, respectively. The output of the multiplier 31 is supplied to one input of a summing circuit 35 and the output of the multiplier 33 is supplied to a second input thereof. In this embodiment the output of the multiplier 33 is connected so that the negative thereof is added to the output of the multiplier 31. The output of the summing circuit 35 is connected through a low pass filter 37 to a terminal 39. The signal at the terminal 39 is a phase error signal generally in the form cos $\phi$.

The in-phase and quadrature channel signals at the terminals 19 and 23 are each also connected to an input of a third multiplier 41 in the combining circuit 30. The multiplier 41 multiplies the in-phase and quadrature channel signals together and the output is supplied through a low pass filter 43 to a terminal 45. The signal at the terminal 45 is a phase error signal generally in the form of sin $\phi$.

The two phase error signals at the terminals 39 and 45 make up an estimate of the initial phase error between the output signal of the oscillator 15 and the carrier of the signal received at the input terminal 10. It will be noted by those skilled in the art that the signal at the terminal 45, or a substantially similar signal is fed back to the oscillator 15 to control the phase of the oscillator and remove the phase error, in prior art structures, e.g. a Costas loop. Also in prior art structures, the signal at the terminal 39 may be utilized to obtain information as to the coherent amplitude of the input signal.

While in the present embodiment an MSK phase detector is illustrated with a combining circuit supplying two phase error signals 90° apart, it will be understood by those skilled in the art that any of the multitude of shift keyed phase detectors might be utilized and, depending upon the detector, different numbers of phase error signals will be generated. For example, in the phase detector utilized in patent '378 (described above) a QPSK detector is utilized and four output signals are provided. A circuit providing three outputs 120° apart can also be provided in some shift keyed phase detectors, as will be understood by those skilled in the art. Thus, the phase detector provides a plurality of phase error signals differing from each other by a fixed phase angle.

The plurality of phase error signals at the terminals 39 and 45 are combined with in-phase and quadrature channel signals in a combining circuit 50 in a manner to regenerate the original data signal. The terminal 39 is connected to first inputs of two multipliers 51 and 53. The terminal 45 is connected to inputs of a second pair of multipliers 55 and 57. The output of the multiplier 12 in the phase detector is connected to second inputs of the multipliers 53 and 55 while the output of the multiplier 14 in the phase detector is connected to second inputs of the multipliers 51 and 57. Thus, the in-phase and quadrature channel signals are cross multiplied with the phase error signals. The outputs of the multipliers 51 and 55 are connected to a summing circuit 60 so that the output signals are added together. The outputs of the multipliers 53 and 57 are connected to a second summing circuit 63 so that the output signal of the multiplier 57 is subtracted from the output signal of the multiplier 53. The signal available at the output of the summing circuit 60 is represented generally by the following equation.

$$(D_I \cos \phi + D_Q \sin \phi) \sin \phi + (31\ D_I \sin \phi + D_Q \cos \phi) \cos \phi = D_Q$$

or $$D_I \cos \phi \sin \phi + D_Q \sin^2 \phi - D_I \sin \phi \cos \phi + D_Q \cos^2 \phi = D_Q$$

The output signal from the summing circuit 63 is represented generally by the following equation.

$$(D_I \cos \phi + D_Q \sin \phi) \cos \phi - (-D_I \sin \phi + D_Q \cos \phi) \sin \phi = D_I$$

$$D_I \cos^2 \phi + D_Q \sin \phi \cos \phi + D_I \sin^2 \phi - D_Q \cos \phi \sin \phi = D_I$$

It will be noted that by cross multiplying the input signals and combining them in the correct relationship the phase errors cancel and the signals available at the outputs of the summing circuit 60 and 63 are in-phase and quadrature data signals. These signals are applied to a hybrid coupler 65 which combines them into a single output, available at an output terminal 70, in a manner well known to those skilled in the art. It will of course be understood that when additional phase error signals are produced by the combining circuit connected to the output of the phase detector (because of a different type of shift keyed modulation) that additional multipliers and summing circuits will be required for the combining to remove the phase error from the data signals. Further, in some instances, such as in BPSK and QPSK modulation, the hybrid coupler 65 is not required. Also, in SMSK and BPSK modulation the $\phi$'s in the above equations will be a double angle, which may be represented by the term $2\phi$ in all of the above equations, and in QPSK modulation the $\phi$'s will be a quadruple angle, which may be represented by the term $4\phi$. Since different angles are represented by different types of shift keyed modulation, the general term which may be used in the above equations is $N\phi$, where N equals any positive integer.

The low pass filters 37 and 43 remove noise from the phase error signals, or control the system signal to noise ratio, and determine the acquisition time of the system. Since greater filtering (lower S/N) necessitates a longer acquisition time, these two functions are not compatible and a compromise between the acquisition time and the amount of filtering must be determined. This compromise will depend upon the application of the system and, hence, the allowable acquisition time and the amount of filtering required. However, even with the compromised filtering, the open loop feed forward phase correction circuitry can achieve an acquisition time which is a substantial improvement in acquisition time over the prior art devices which utilize a closed loop to adjust the local oscillator phase.

Therefore, a rapid acquisition carrier demodulator is illustrated which is relatively simple to manufacture and which incorporates a substantially improved acquisition time. While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A rapid acquisition carrier demodulator comprising:
   (a) a shift keyed phase detector having an input for receiving a signal including data shift keyed modulated on a carrier, a local oscillator connected to supply a reference frequency to said phase detector, and an in-phase channel and a quadrature channel each providing a signal generated from the received signal and each including data at differing phase error angles relative to the local oscillator reference frequency;

(b) first combining means coupled to said phase detector to receive the in-phase and quadrature channel signals and generate a plurality of phase error signals differing from each other by a fixed phase angle;

(c) low pass filter means coupled to pass the plurality of phase error signals and substantially reduce noise prevalent in the plurality of phase error signals; and (d) second combining means coupled to said phase detector and said low pass filter means to receive the in-phase and quadrature channel signals and the plurality of phase error signals for combining the signals to provide a data signal.

2. A rapid acquisition carrier demodulator as claimed in claim 1 wherein the first combining means is constructed to generate two phase error signals in the general form of $\sin N\phi$ and $\cos N\phi$, where N is a positive integer and $\phi$ is the phase error angle between the received signal carrier and the local oscillator.

3. A rapid acquisition carrier demodulator as claimed in claim 2 wherein the shift keyed phase detector is constructed for receiving one of biphase shift keyed and serial minimum phase shift keyed modulated signals and N is equal to 2.

4. A rapid acquisition carrier demodulator as claimed in claim 1 wherein the second combining means includes a plurality of multipliers connected to cross-multiply the in-phase and quadrature channel signals with the plurality of phase error signals.

5. A rapid acquisition carrier demodulator as claimed in claim 4 wherein the second combining means further includes a plurality of summing circuits connected to the plurality of multipliers for combining the cross-multiplied signals to provide output signals representative of in-phase and quadrature data.

6. A rapid acquisition carrier demodulator as claimed in claim 5 wherein the second combining means further includes a hybrid coupler connected to receive the in-phase and quadrature data signals and supply a single output signal representative of the original data.

7. A rapid acquisition carrier demodulator as claimed in claim 1 wherein the low pass filter means includes a plurality of low pass filters, one for each of the plurality of phase error signals and the low pass filters are designed with a frequency response to provide a minimum noise with minimum acquisition time for the demodulator.

8. A method of providing rapid acquisition carrier demodulation in conjunction with a shift keyed phase detector constructed to receive a signal, including data shift keyed modulated on a carrier, and having a local oscillator connected to supply a reference frequency to said detector for providing an in-phase channel signal and a quadrature channel signal, said method comprising the steps of:

(a) combining the in-phase and quadrature channel signals to generate a plurality of phase error signals differing from each other by a fixed phase angle;

(b) filtering the plurality of phase error signals to substantially reduce the noise therein;

(c) combining the filtered phase error signals with the in-phase and quadrature channel signals to provide a data signal substantially similar to the original data signal.

9. A method as claimed in claim 8 wherein the step of combining the in-phase and quadrature channel signals includes squaring each signal and summing the squared signals to provide a first phase error signal approximately equal to the cosine of the phase error between the carrier of the received signal and the local oscillator frequency, and multiplying the in-phase and quadrature channel signals together to provide a second phase error signal approximately equal to the sine of the phase error between the carrier of the received signal and the local oscillator frequency.

10. A method as claimed in claim 8 wherein the step of combining the filtered phase error signals with the in-phase and quadrature channel signals includes cross-multiplying the in-phase and quadrature channel signals with each of the plurality of filtered phase error signals and combining the products to provide a data signal in phase with the original data signal.

* * * * *